United States Patent
Berton (10) Patent No.: US 12,077,273 B1
(45) Date of Patent: Sep. 3, 2024

(54) WIRELESS RECONFIGURABLE YACHT CONTROLLER

(71) Applicant: The Yacht Group, LLC, Coral Gables, FL (US)

(72) Inventor: Gerald Berton, Coral Gables, FL (US)

(73) Assignee: The Yacht Group, LLC, Coral Gables, FL (US)

( * ) Notice: Subject to any disclaimer, the term of this patent is extended or adjusted under 35 U.S.C. 154(b) by 0 days.

(21) Appl. No.: 18/441,802

(22) Filed: Feb. 14, 2024

Related U.S. Application Data (60) Provisional application No. 63/445,428, filed on Feb. 14, 2023.

(51) Int. Cl.
| | | |
|---|---|---|
| *B63H 21/21* | (2006.01) | |
| *B63B 49/00* | (2006.01) | |
| *B63B 79/40* | (2020.01) | |
| *G05D 1/225* | (2024.01) | |
| *G05D 1/226* | (2024.01) | |
| *G05D 109/30* | (2024.01) | |

(52) U.S. Cl.
CPC .......... *B63H 21/213* (2013.01); *B63B 49/00* (2013.01); *B63B 79/40* (2020.01); *G05D 1/225* (2024.01); *G05D 1/226* (2024.01); *B63H 2021/216* (2013.01); *G05D 2109/34* (2024.01)

(58) Field of Classification Search
CPC  B63H 21/213; B63H 2021/216; B63B 79/40; B63B 49/00; G05D 1/225; G05D 1/226; G05D 2109/34
USPC .......................................................... 701/2
See application file for complete search history.

(56) References Cited

U.S. PATENT DOCUMENTS

| | | |
|---|---|---|
| 5,751,166 A | 5/1998 | Shieh et al. |
| 6,264,513 B1 | 7/2001 | Marsh |
| 6,431,930 B1 | 8/2002 | Holt |
| 6,487,983 B1 | 12/2002 | Jonsson et al. |
| 6,508,190 B1 | 1/2003 | Norton |
| 6,520,105 B2 | 2/2003 | Koda et al. |
| 6,655,309 B1 | 12/2003 | Stephens |
| 6,816,088 B1 * | 11/2004 | Knoska .................. G07C 5/085 340/459 |

(Continued)

FOREIGN PATENT DOCUMENTS

| | | | | |
|---|---|---|---|---|
| GB | 2590760 A  * | 7/2021 | ............. | B63B 43/18 |
| WO | WO-2020069750 A1 * | 4/2020 | | |

OTHER PUBLICATIONS

Anna et al., "Data-Driven Vessel Operational Profile Based on t-SNE and Hierarchical Clustering," 2018, Publisher: IEEE.*

(Continued)

*Primary Examiner* — Tuan C To
(74) *Attorney, Agent, or Firm* — The Concept Law Group, PA; Scott D. Smiley; Scott M. Garrett (57) ABSTRACT

Remote-control units used for docking a marine vessel include both a radio transceiver for communicating with a helm receiver to which control signals for the various vessel systems can be sent, and a WiFi transceiver that can be used to remotely access and adjust the operational profiles stored in the remote control unit. Each of the profiles causes the remote control unit to control one or more vessel systems by ramping up their output over an initial time duration to a maximum profile setting which is a proportion of the maximum output capability of the vessel system.

18 Claims, 11 Drawing Sheets

(56) References Cited

U.S. PATENT DOCUMENTS

| | | | |
|---|---|---|---|
| 6,865,997 B2 | 3/2005 | Stephens | |
| 7,104,212 B2 | 9/2006 | Brianza | |
| 7,467,595 B1 * | 12/2008 | Lanyi | B63H 25/02 |
| | | | 114/144 R |
| 10,589,717 B2 * | 3/2020 | Cermak | B60R 25/01 |
| 2018/0057133 A1 * | 3/2018 | Andrasko | B63B 79/40 |
| 2019/0361457 A1 * | 11/2019 | Johnson | G05D 1/0044 |
| 2021/0263516 A1 * | 8/2021 | Miller | B63H 20/14 |
| 2023/0059445 A1 * | 2/2023 | Lammers-Meis | B63B 21/38 |
| 2023/0259085 A1 * | 8/2023 | Mossman | B63B 79/40 |
| | | | 701/34.2 |
| 2024/0092464 A1 * | 3/2024 | Crawford | B63C 9/0011 |

OTHER PUBLICATIONS

Spyridon et al., "Improving Engine Room Ventilation Systems: A Data-Driven Process Controller for Energy-Efficient, Variable-Speed Fan Operation in Marine Vessels," 2016, vol. 22, Publisher: IEEE.*

* cited by examiner

WIRELESS RECONFIGURABLE YACHT CONTROLLER

CROSS REFERENCE

This application claims the benefit of U.S. provisional application No. 63/445,428, filed Feb. 14, 2023, the entirety of which is hereby incorporated by reference.

FIELD OF THE INVENTION

The present invention relates generally to remote devices used to control maneuvering of a marine vessel particularly at low-speed operations such as docking, and, more particularly, relates to a remote-control marine vessel controller that operates using profiles of prescribed maneuvers that can be remotely reconfigured.

BACKGROUND OF THE INVENTION

Remote-control docking systems allow a vessel operator to stand on different portions of the vessel other than the helm, and this allows the operator a much better view of the boat and marine fixtures, such as a dock, pilings, etc. A conventional remote-control system for a vessel is a one-way system; the remote-controller only transmits signals to a helm receiver that carries out the input commands. In a conventional, simple remote docking system, the remote unit essentially duplicates the helm controls and allows the operator to make all the decisions on how fast the engine and thruster are turned, and for how long. This approach is fine for small boats. For larger vessels and yachts, this is not such a simple operation. Instead, the remote-controllers are programmed to perform specific maneuvers. In order to do this, technicians have to test the vessel and see how it responds, and then develop a profile of operations to accomplish a particular maneuver. For example, a docking maneuver to move the vessel a certain amount backward, and to the side will require control of the engine(s) and thruster, and based on the size and load of the vessel the speed and duration of those operations can vary. Thus, setting up a remote-control system for a larger vessel or yacht can be very involved, requires the presence of a technician at the vessel, and represents a substantial cost. If there is a problem with the remote, or the system, to fix it or replace a remote may require having a technician travel to the vessel to diagnose and correct the system. This obviously represents a large expense.

Therefore, a need exists to overcome the problems with the prior art as discussed above.

SUMMARY

In accordance with some embodiments of the inventive disclosure, there is provided a remote-control unit for docking a marine vessel that includes a processor and a memory that is operably coupled to the processor. There is a plurality of docking maneuver profiles stored in the memory. Each profile of the plurality of docking maneuver profiles indicates a maximum vessel system setting for a respective vessel system, and a ramp up time. There is also a radio transceiver operably coupled to the processor that is configured to communicate with a helm receiver. There is a WiFi transceiver operably coupled to the processor that can also communicate with the helm receiver as well as a helm control. There is at least one actuator operably coupled to the processor. When the at least one actuator is actuated the radio transceiver transmits control signals to the helm receiver in accordance with a selected one of the plurality of docking maneuver profiles to cause the respective vessel system to increase output over a duration equal to the ramp up time period to the maximum vessel system setting.

In accordance with a further feature, the radio transceiver transmits control signals on two different radio frequency bands.

In accordance with a further feature, the radio transceiver transmits the control signals over a series of channels in each of the two radio frequency bands by continuously scrolling through the channels.

In accordance with a further feature, the at least one actuator is at least one incremental actuator.

In accordance with a further feature, the at least one actuator is a joystick that provides proportional actuation.

In accordance with a further feature, the memory further contains security parameters, and wherein the remote-control unit can be accessed remotely via the WiFi transceiver by providing credentials that satisfy the security parameters.

In accordance with a further feature, the processor is configured to cast an interface to a helm display via the WiFi transceiver.

In accordance with a further feature, the respective vessel system is an engine of the marine vessel.

In accordance with a further feature, there is further included a selector button that is operably coupled to the processor and which is operable to select one of the plurality of docking maneuver profiles.

In accordance with some embodiments of the inventive disclosure, there is provided a docking system for a marine vessel, the marine vessel having an engine, the system including a helm control that is operably coupled to the engine. The system also including a helm receiver that is operably coupled to the helm control. There system further includes a remote-control unit that includes a processor, a memory operably coupled to the processor, a radio transceiver operably coupled to the processor that is configured to communicate with the helm receiver, a WiFi transceiver operably coupled to the processor, and at least one actuator operably coupled to the processor. There is a plurality of docking maneuver profiles stored in the memory, where each of profile of the plurality of docking maneuver profiles indicates a maximum vessel system setting for the engine, and a ramp up time. When the at least one actuator is actuated the radio transceiver transmits control signals to the helm receiver in accordance with a selected one of the plurality of docking maneuver profiles to cause the engine to increase output over a duration equal to the ramp up time period to the maximum vessel system setting.

Although the invention is illustrated and described herein, it is, nevertheless, not intended to be limited to the details shown because various modifications and structural changes may be made therein without departing from the spirit of the invention and within the scope and range of equivalents of the claims. Additionally, well-known elements of exemplary embodiments of the invention will not be described in detail or will be omitted so as not to obscure the relevant details of the invention.

Other features that are considered as characteristic for the invention are set forth in the appended claims. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one of ordinary skill in the art to variously employ the present invention in virtually any appropriately detailed structure. Further, the terms and phrases used herein are not intended to be limiting; but rather, to provide an understandable description of the invention. While the specification concludes with claims defining the features of the invention that are regarded as novel, it is believed that the invention will be better understood from a consideration of the following description in conjunction with the drawing figures, in which like reference numerals are carried forward. The figures of the drawings are not drawn to scale.

Before the present invention is disclosed and described, it is to be understood that the terminology used herein is for the purpose of describing particular embodiments only and is not intended to be limiting. The terms "a" or "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "coupled," as used herein, is defined as connected, although not necessarily directly, and not necessarily mechanically. The term "providing" is defined herein in its broadest sense, e.g., bringing/coming into physical existence, making available, and/or supplying to someone or something, in whole or in multiple parts at once or over a period of time.

"In the description of the embodiments of the present invention, unless otherwise specified, azimuth or positional relationships indicated by terms such as "up", "down", "left", "right", "inside", "outside", "front", "back", "head", "tail" and so on, are azimuth or positional relationships based on the drawings, which are only to facilitate description of the embodiments of the present invention and simplify the description, but not to indicate or imply that the devices or components must have a specific azimuth, or be constructed or operated in the specific azimuth, which thus cannot be understood as a limitation to the embodiments of the present invention. Furthermore, terms such as "first", "second", "third" and so on are only used for descriptive purposes, and cannot be construed as indicating or implying relative importance.

In the description of the embodiments of the present invention, it should be noted that, unless otherwise clearly defined and limited, terms such as "installed", "coupled", "connected" should be broadly interpreted, for example, it may be fixedly connected, or may be detachably connected, or integrally connected; it may be mechanically connected, or may be electrically connected; it may be directly connected, or may be indirectly connected via an intermediate medium. As used herein, the terms "about" or "approximately" apply to all numeric values, whether or not explicitly indicated. These terms generally refer to a range of numbers that one of skill in the art would consider equivalent to the recited values (i.e., having the same function or result). In many instances these terms may include numbers that are rounded to the nearest significant figure. To the extent that the inventive disclosure relies on or uses software or computer implemented embodiments, the terms "program," "software application," and the like as used herein, are defined as a sequence of instructions designed for execution on a computer system. A "program," "computer program," or "software application" may include a subroutine, a function, a procedure, an object method, an object implementation, an executable application, an applet, a servlet, a source code, an object code, a shared library/ dynamic load library and/or other sequence of instructions designed for execution on a computer system. Those skilled in the art can understand the specific meanings of the above-mentioned terms in the embodiments of the present invention according to the specific circumstances.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and explain various principles and advantages all in accordance with the present invention.

DETAILED DESCRIPTION

While the specification concludes with claims defining the features of the invention that are regarded as novel, it is believed that the invention will be better understood from a consideration of the following description in conjunction with the drawing figures, in which like reference numerals are carried forward. It is to be understood that the disclosed embodiments are merely exemplary of the invention, which can be embodied in various forms.

Figure 1:
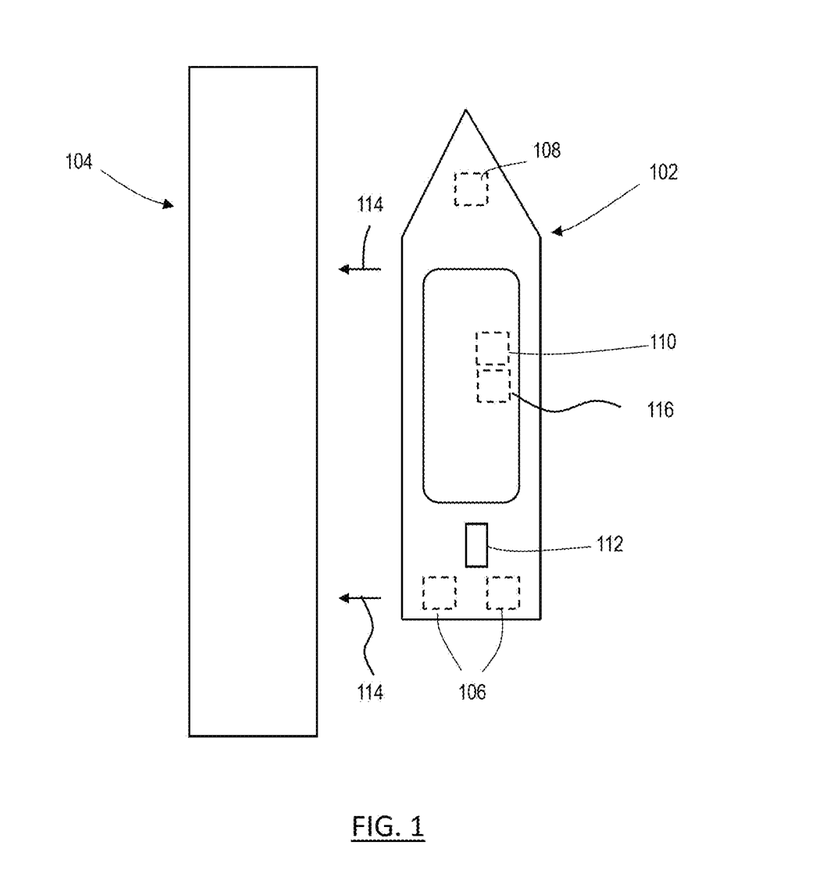
FIG. 1 is a diagram showing a marine vessel (yacht) being docked using a remote-control.

FIG. 1 is a diagram showing a marine vessel (yacht) 102 being docked using a remote-control 112, in accordance with some embodiments. The vessel 102 is shown adjacent a dock 104, and needs to tie up to the dock 104. In the present example, vessel 102 is to be moved in the direction of arrow 114 towards the dock 104. The vessel can have one or more engines 106, a bow thruster 108, an aft thruster (not shown), a helm 110 and a helm receiver 116. The helm 110 is a physical location on the vessel where vessel controls are provided, and the helm receiver 116 is connected to the helm controls so that control signal can be provided to the various vessel systems (engines, thrusters). While the helm 110 is a convenient location to operate the vessel while underway, since it allows control of most if not all vessel systems, it is not so ideal when performing low speed maneuvers like docking. For those type of operations, it is much more helpful to be on the deck, to be able to see exactly where the vessel is in relation to fixed structure like the dock 104. In general, the helm 110 allows control of all vessel systems, including the engines, thrusters, anchor, etc. At the helm 110 there are effectors, such as levers and a steering wheel. The position of each of these effectors in their range of motion is converted to a signal that is sent to a local system controller for the corresponding system, and the system controller adjusts the system component to the corresponding level of operation as indicated by the effector. For example, an engine throttle lever can be used to adjust engine speed. When the engine throttle lever is placed in a given position, other than an idle position, the position of the lever will be detected and quantified. The quantified value with then be turned into a signal provided to the engine controller, and the engine will be controlled to turn its engine at a speed corresponding with that lever position, in a range from idle to full speed, in revolutions per minute (RPM). The same is true for the thruster control, and in many cases the rudder control as well. Thus, the helm 110 is a station where control effectors are used to signal to the individual vessel components a signal that operates those components at a desired level, in a desired way. The helm receiver 116 is capable of receiving signals from the remote-control unit 112 to provide signals to the vessel systems all thereby allow remote operation and control of the vessel systems.

The remote-control 112 sends signals to the helm receiver 116 to operate the vessel systems according to a selected profile for a particular maneuver to be performed. In some embodiments, the remote-control 112 transmits using multiple radio frequency bands and "scrolls" or hops through defined channels while operating to prevent others from being able to take control of the vessel and to resist any spurious radio noise sources that might otherwise cause a disconnect between the remote-control unit 112 and the helm receiver 116. Further, the remote-control 112 is able to carry out control of the vessel systems according to any of several profiles that allow for increase over time to more gently move the vessel. For example, rather than simply turning the bow thruster 108 or an engine 106 on at a given proportion (e.g. 15%) or speed (e.g. RPMs), the remote-control 112 can ramp up these systems over a period of time, according to a selected profile, when an actuator on the remote-control 112 is engaged by the operator, in order to provide more fine control of a given vessel component. For example, in order to move the vessel 102 in the direction of arrows 114, the bow thruster can be engaged in accordance with a profile in which the speed of the thruster is increased from zero to a maximum speed over a period of several seconds. Similarly, the port engine can be operated in forward direction using a profile that sets a maximum speed, and a ramp-up time to reach that maximum speed. at a pre-selected speed and the starboard engine is operated in the reverse direction at a pre-selected speed. The specific maximum speed and ramp-up duration for each of the three components will depend on the selected profile, which the operator can chose based on the docking conditions. The remote-control unit 112, in addition to having a dual band radio transmitter for connecting to, and transmitting control signals to the helm receiver 116, also has a wireless network transceiver that allows it to receive profiles and store those profiles into a local memory, as well as to receiver changes to stored profiles. This allows the remote-control receiver 112 to be programmed for a given vessel with several operating profiles that an operator can select from for various docking conditions. Thus, if an operator decides a given profile needs to be adjusted, the adjustment can be performed locally, or a remotely located technician and make the change, rather than requiring an on-site technician visit. The benefit of ramping up a vessel system over a period of time is that the system then does not experience the stress of being turned on from zero to a selected speed near-instantly. The ramping up of component speed can also result in a quieter operation of the vessel system.

Figures 2A, 2B:
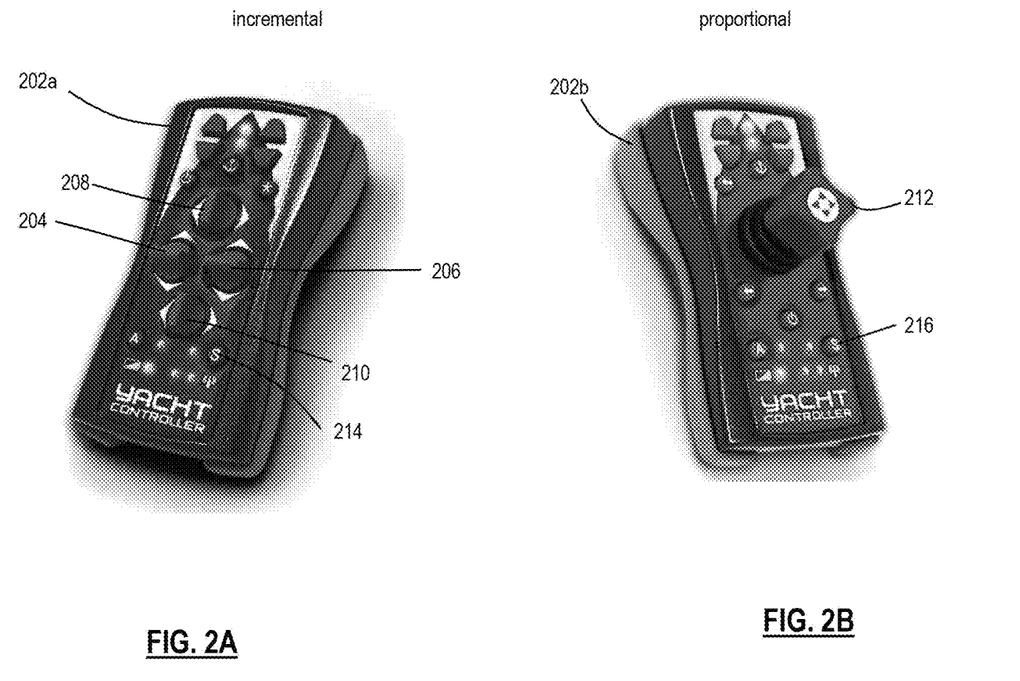
FIGS. 2A and 2B show a pair of remote-control units that can be used with the disclosed invention.

FIGS. 2A and 2B an incremental remote-control unit 202a and a proportional remote-control unit 202b that are used to remotely operate vessel system, in accordance with some embodiments. The remote-control units both include dual band radio transceivers as well as WiFi transceivers, and can store information such as operating profiles and security information to prevent tampering. Further, by being WiFi enabled, they can be remotely accessed by authorized parties to perform system diagnostics, update firmware, adjust or charge operating profiles, among other operations. The remote-control units can also 'cast' an interface to a portable device or a screen at the helm 110 (e.g. on a chart plotter display) so that others can see real time parameters, change or adjust profile settings, and so on. The remote-control units provide both incremental and proportion control of vessel systems. They can be used independently or cooperatively.

The incremental remote-control 202a has two engine control actuators 204, 206, and two thruster actuators 208, 210. There is also a select button 214. To use the incremental remote-control unit 202a, the user first ensures that the remote-control unit 202a has established radio contact with the helm receiver 116. Then the user can press the selector button 214 to select from one of several profiles. Each profile specifies a maximum level of operation, and a ramp-up time. For example, a given profile can specific a maximum of 14% and a ramp-up time of one second. That means when an actuator 204, 206, 208, or 210 is pushed, the corresponding vessel system will increase from idle (zero) to 14% over a period of one second, and then remain at 14% until the actuator is released, whereupon the system speed will fall back to zero. As an example, using the profile of 14% and one second of ramp up time, when the user presses the right engine actuator 206 forward (e.g. away from the selector button 214), the starboard engine will start turning from idle or zero RPMs, to 14% of it's maximum speed over a period of one second, and then it will remain at 14% until the actuator 206 is released. If the operator were to then pull back on the actuator 206, then the starboard engine would operator in reverse, ramping up to 14% of maximum speed over a period of one second, until the actuator 206 is released. The other vessel systems can be controlled similarly. If the profile of a 14% maximum speed and one second ramp-up time is not suitable for given conditions, then the operator can use the selector button 214 to select another profile that may be more suitable for the given docking conditions. If the operator releases the actuator before the end of the ramp-up time period, the vessel system will simply shut off and go back to zero.

The proportional remote-control unit 202b also has a selector button 216 to select a desired profile. Instead of having individual actuators for each vessel system, however, it has a joystick 212 that can be moved forward, backward, left, and right, and combinations of those positions. The profile sets the maximum system speed, so that if the joystick is pushed all the way forward, for example, the engines will ramp up to the maximum speed allowed by the selected profile. However, if the joystick is pushed only halfway, then the engine will only ramp up to half of the maximum speed set by the selected profile. Hence, the position of the joystick is proportional to a maximum, and the corresponding vessels systems will be operated at the selected proportion. If the joystick is released, it will return to center and all of the vessel systems will likewise return to zero output (i.e. the propeller will be disconnected from the engine while the engine idles). The joystick 212 allows an operator to engage both the engines and thrusters.

Figure 3:
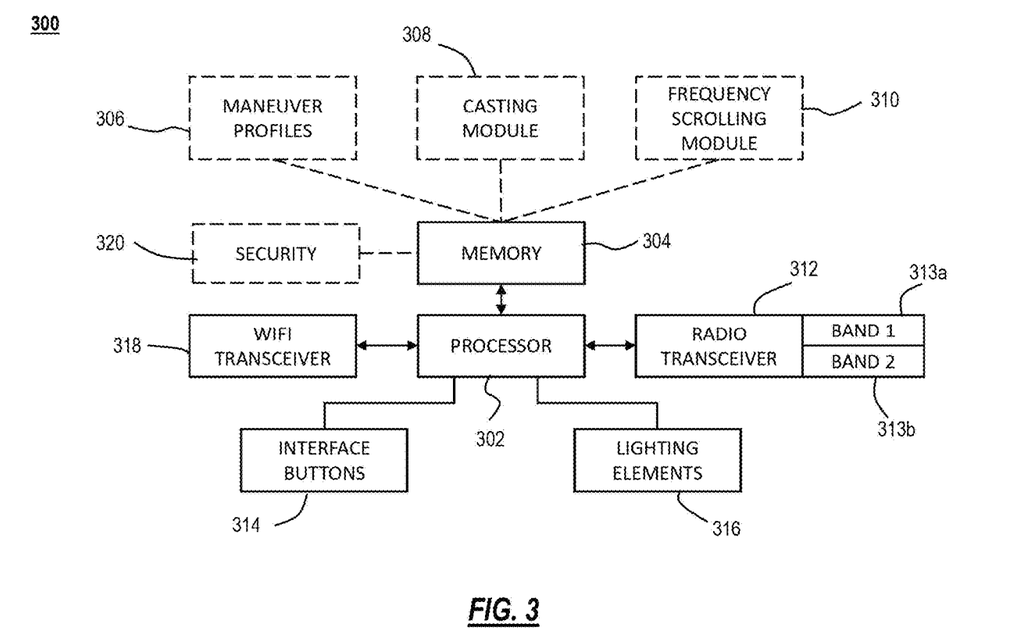
FIG. 3 shows a block diagram of a remote-control unit for controlling a yacht, in accordance with some embodiments.

FIG. 3 shows a block diagram of a remote-control unit 300 for controlling a yacht, in accordance with some embodiments. The remote-control unit 300 can be either of the units 202a, 202b of FIGS. 2A, 2B or unit 112 of FIG. 1. Each remote-control unit includes a processor 302 that is coupled to memory 304. The memory 304 can include both volatile and non-volatile memory so that data and instruction code can be stored and instantiated, and random access memory (RAM) can be used for data structures as well as executing instruction code. Both a radio transceiver 312 and a WiFi transceiver 318 are included as well. The radio transceiver 312 communicates command and control signals in a secure manner to the helm receiver 116 that resists noise by using two bands 313a, 313b to provide redundancy. That is, the radio transceiver 312 transmits signals on both bands 313a, 313b at the same time. Each of the bands 313a, 313b are a separate radio unit having their own mixers, modulators, frequency generators, and other radio circuits. In addition, each of spectrum of the bands are divided into several different channels, and the bands 313a, 313b scroll through those channels during operation in case there is interference on any one of the channels. The channel diversity prevents noise and interference and even attempts to disrupt or capture a channel from interfering with vessel control. In one example, each of the bands 313a, 313b can define seven channels, which results in forty nine channel combinations across two different frequency bands. The WiFi transceiver 318 allows the remote-control 300 to be accessed remotely and both send and receive data and other information.

The memory 304 can include, for example, several profiles 306 which specify and maximum system speed and a ramp duration time, and the remote-control unit 300 can be operated to select from among those profiles for vessel system operation, based on vessel and environmental conditions. There can be stored in the memory 304 a casting module which allows the remote-control unit 300 to display an interface, via the WiFi transceiver 318, on a helm screen, such as a chart plotter screen. Since the display is a touch screen type display, it can be used to adjust or change profile parameters of one or more of the profiles 306, as well as to perform other operations on the remote-control unit 300. A frequency scrolling module can be used to control the bands 313a, 313b in their operation to transmit some information, and then change to another channel, transmit some more information, change channel, and so on, continuously. Alternatively, the bands 313a, 313b can be designed to perform that task themselves.

A security space 320 can contain encrypted security credentials that are used to determine whether someone attempting to access the remote-control unit 300 via the WiFi transceiver 318, for example, is actually authorized to do so. When a user attempt to access the remote-control unit 300, they are prompted for access credentials, such as, for example, a user name and password. If they can provide this information, then they will be allowed to access the remote-control unit 300 and, for example, make changes to the profile(s) 306, update firmware of the remote-control unit 300, and so on.

The remote-control unit 300 also has interface buttons and actuators 314 that each provide into to the remote-control unit 300 and those inputs are assessed by the processor 302. The inputs can include a selection indication, which occurs when the selector button is pushed, as when the operator wants to select and use a specific profile. In addition, the state of the actuator(s) can be assessed to determine what command signals to send to the helm receiver. In the incremental remote-control embodiments, when an engine actuator (e.g. 206) is pushed, the processor causes command signals to be send by the bands 313a, 313b such that the corresponding vessel system ramps up over a duration specified in the profile to the maximum level specified in the profile, until the user releases the actuator, where the processor will cause the bands 313a, 313b to send command signals that shut down the output of the corresponding vessel system. In the case of the proportional remote-control unit, then the position of the joystick is converted to a proportion of the maximum operating level of the corresponding vessel systems, and the processor 302 sends command signals accordingly via the radio transceiver 312 and the bands 313a, 313b. There can also be lighting elements 316 such as light emitting diodes (LEDs) that indicate the state of the remote-control unit 300.

Figure 4A:
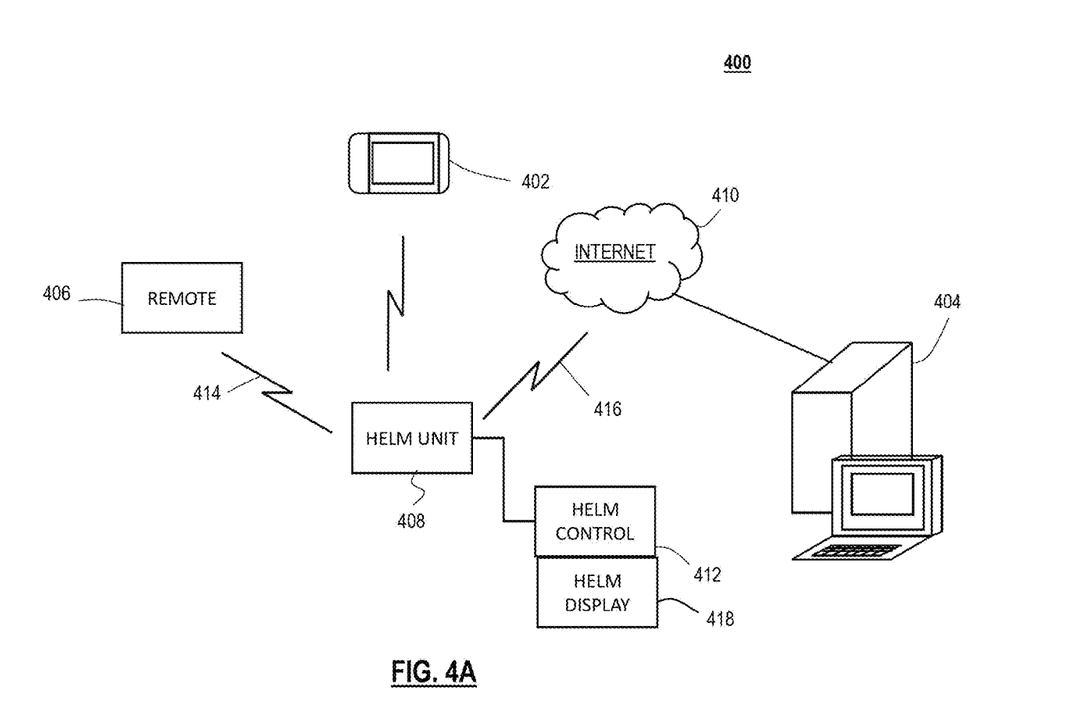
FIG. 4A shows a system diagram to illustrate how the remote-control units and system can be remotely accessed, in accordance with some embodiments.

FIG. 4A shows a system diagram 400 to illustrate how the remote-control units 406 and system can be remotely accessed, in accordance with some embodiments. The remote-control unit 406 can be substantially similar or the same as any of the previously described remote-control units. The WiFi transceiver (e.g. 318) of the remote-control unit 406 allows the remote-control unit to be accessed by authorized parties, such as a smartphone 402 or tablet device on board the vessel, or by a remote computer system 404 via the internet 410. This allows remote diagnostics to be performed and changes made to the remote-control unit 406 without having to send a technician to the vessel, which is a substantial savings of time and money for the vessel owner. There is a helm unit 408 or helm receiver that is in communication with the remote-control unit 406 in several modes of communication, including the command signals 414 sent by the radio transceiver and network communication via a WiFi transceiver. In fact, the helm unit 408 can include two different WiFi transceivers, including one dedicated to network communication 416 via the internet 410, and a local WiFi for network communication with the remote unit 406, a smartphone 402, and other such computing devices. The helm unit 408 is connected to the helm control 412 which routes signals from the helm to the various vessel systems (e.g. engines and thrusters). The helm control 412 can also include a display 418 on which the remote unit can cast an interface. Similarly, the smartphone device 402 can run an application program that provides an interface for interacting with the remote unit 406 via the helm unit 408. That is, the helm unit can act as a local wireless router to facilitate network communication between the remote unit 406 and other devices. Likewise, the remote computing system 404 can be an administrator that has access privileges to access the remote-control unit 406.

Figure 4B:
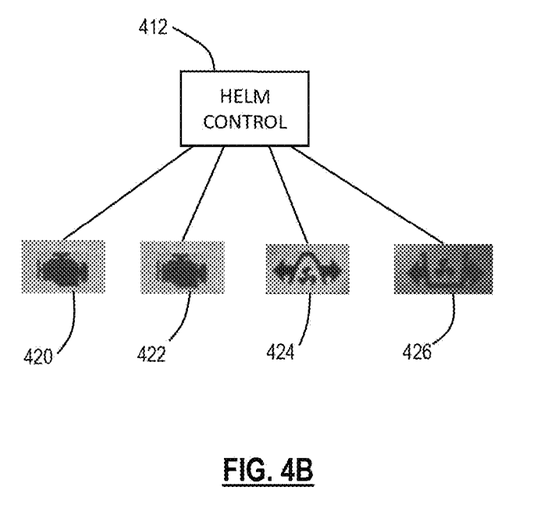
FIG. 4B shows a common helm control configuration on vessels.

FIG. 4B shows a common vessel configuration where the helm control 412 is in communication with each of several vessel systems, such as engines 420, 422, a bow thruster 424, and an aft thruster 426. Communication between the helm control 412 and each of the systems 420, 422, 424, 426 can be analog or digital, and each of the systems 420, 422, 424, 426 has their own local controller that controls the respective vessel system according to the signal received from the helm control 412. Local effectors, such as throttle levers, can be coupled to the helm control as well. Thus, the helm receiver 408 is able to relay signals from the remote-control units to the helm control 412 which then sends the signals to the respective vessel systems 420, 422, 424, 426.

Figure 5:
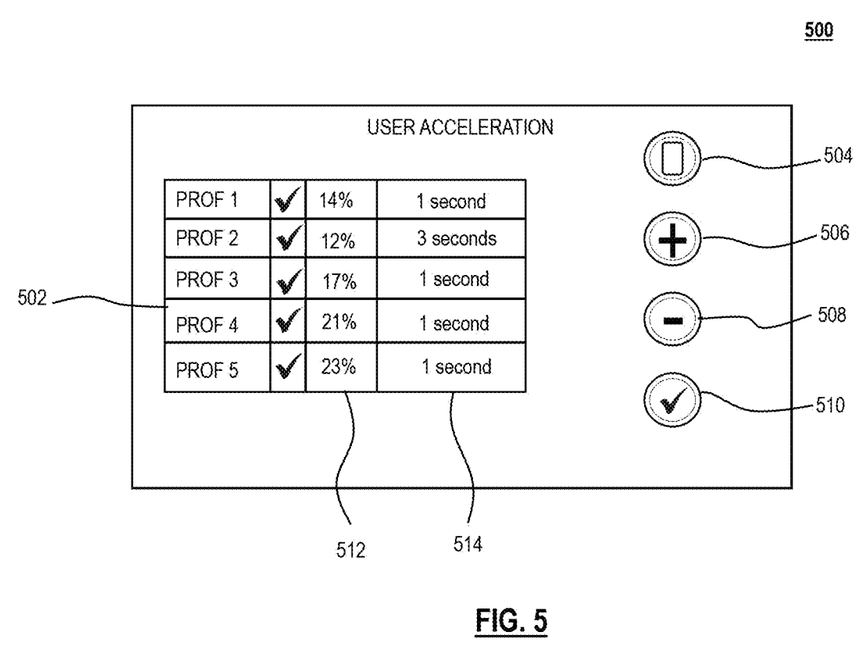
FIG. 5 shows an example of several profiles that can be carried out by the remote-control unit to complete a docking operation.

FIG. 5 shows an example of an interface 500 that can be displayed on a device, and which shows several profiles that can be carried out by the remote-control unit to complete a docking operation. As shown here, the interface is displayed on a helm display (e.g. 416) to allow adjustments to the profiles. The interface 500 shows five profiles in a table 502 where each profile is one row of the table. There is a first column 512 that indicates a maximum system speed of the corresponding profile, and a second column 514 that indicates a ramp up time where the vessel system will be increased from zero output to the maximum profile output specified in column 512. For example, a first profile, "PROF 1" specifies a maximum profile output of 14%, meaning the vessel system being controlled cannot output more than 14% of its maximum output. That is, the remote-control unit will not send command or control signals to the vessel system that causes it to exceed 14% of its maximum operating output. Further, the vessel system being controlled will ramp up from zero output to not more than 14% of the maximum operating output level of the vessel system being controlled over a duration of one second. If the remote-control is a proportional remote-control unit, then the output of the vessel system being controlled will ramp up to the selected proportion at a rate equivalent to increasing from zero to 14% output level over one second, which means the vessel system being controlled may reach the proportional value indicated by the joystick position in a shorter time than the indicated ramp up time of column 514.

The interface 500 allows for an authorized user to change profile values. The interface 500 can be shown on a touch screen, and include several button graphics including a selector button 504, an increase button 506, a decrease button 508, and an accept button 510. The selector button can allow a user to select a profile value, such as by scrolling through each field, and highlighting the field. Once the user selects the field of interest corresponding to a given profile, then the increase and decrease buttons can be used to adjust the value in the selected field. Once the user has adjust the selected field to the desired value, then the user can press the accept button 510 to cause the new value to be stored in the corresponding memory location in the remote-control unit.

Figure 6A:
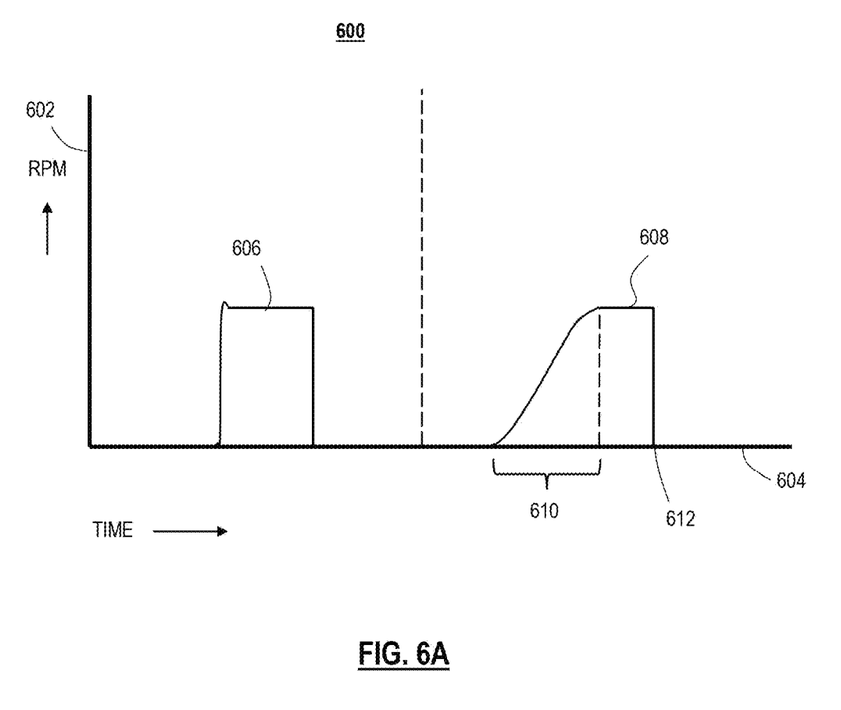
FIG. 6A shows a comparison diagram showing how a prior art remote-control unit controls a thruster or engine, and how the remote-control unit of the inventive disclosure can control the same vessel system.

FIG. 6A shows a graph chart 600 showing how a prior art remote-control unit controls a thruster or engine, and how the remote-control unit of the inventive disclosure can control the same vessel system. The prior art remote unit adjusts the vessel system from idle or off to the target output level, here measured in revolutions per minute (RPM). This may result in overshoot of the target level, and is also quite taxing on the related components (e.g. propeller shaft) and can result in unwanted vibration/noise.

In the graph chart 600 the vertical axis 602 represent vessel system output (e.g. engine or thruster speed), and the horizontal axis 604 represents time. Graph plot 606 represents the prior art remote-control docking systems in which the vessel system output goes from zero to its maximum setting (which is not necessarily the maximum output capability) quite abruptly. This can result in undue stress and strain on the system parts, and create undesirable vibrations and noise.

Figure 6B:
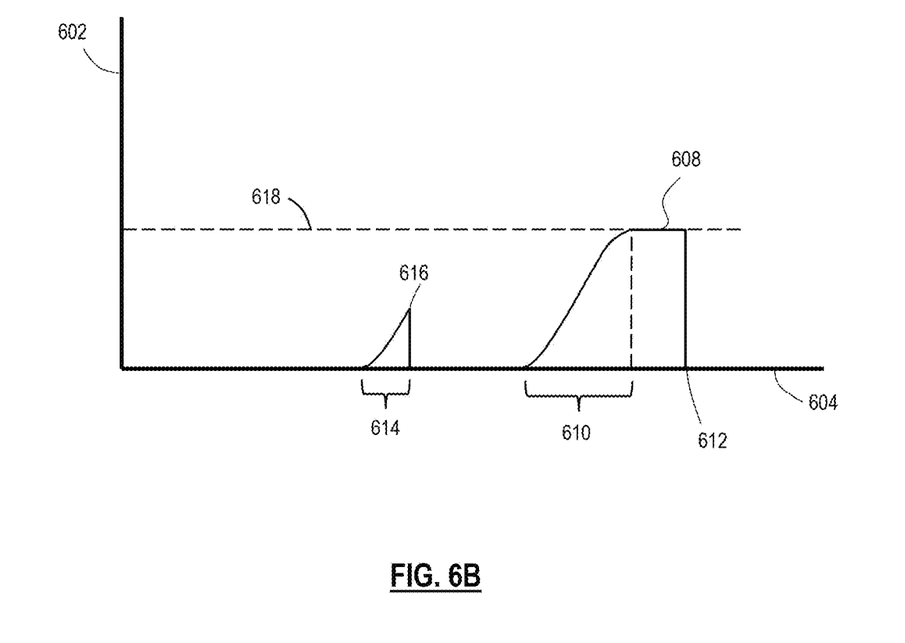
FIG. 6B shows a comparison diagram showing first input at a remote-control unit and a second input at the remote-control using while using a profile, in accordance with some embodiments.

Graph plot 608 represents the output of a vessel system when controlled by a remote-control unit in accordance with the present disclosure. Instead of abruptly increasing the output of the vessel system from zero to its maximum setting, there is a time period 610 over which the output is increased to the maximum setting. The maximum setting being set in the profile, such the value in the field of column 512 of FIG. 5. The duration of time 610 is likewise specified in the profile, in the field of column 514, for example. Thus, if the remote-control unit controlling the vessel system of graph plot 608 were using, for example, profile 2 of FIG. 5, then time period 610 would be three seconds, and the maximum output setting would be 12% of the vessel system's maximum output capability. At time 612 the operator releases the actuator of the remote-control unit, which causes the command signal being sent by the remote-control unit to cause the vessel system output to drop back down to zero. FIG. 6B shows a comparison of graph plot 608 with another graph plot 616 in which the same remote-control unit that produced graph plot 608 is operated using the same profile, but before the vessel system can ramp up its output to the maximum profile setting, the operator releases the actuator of the remote-control unit. Thus, time period 614 is less than time period 610, which is less than the profile ramp up duration, and as a result, the vessel system output does not reach the maximum profile setting 618. This can occur using either the incremental or the proportional remote-control units. Under control of a prior art remote-control system, the same user input provided to create graph plot 616 would have resulted in the vessel system output being at the maximum setting (allowed by the remote-control unit) for substantially all of time period 614.

Figure 7:
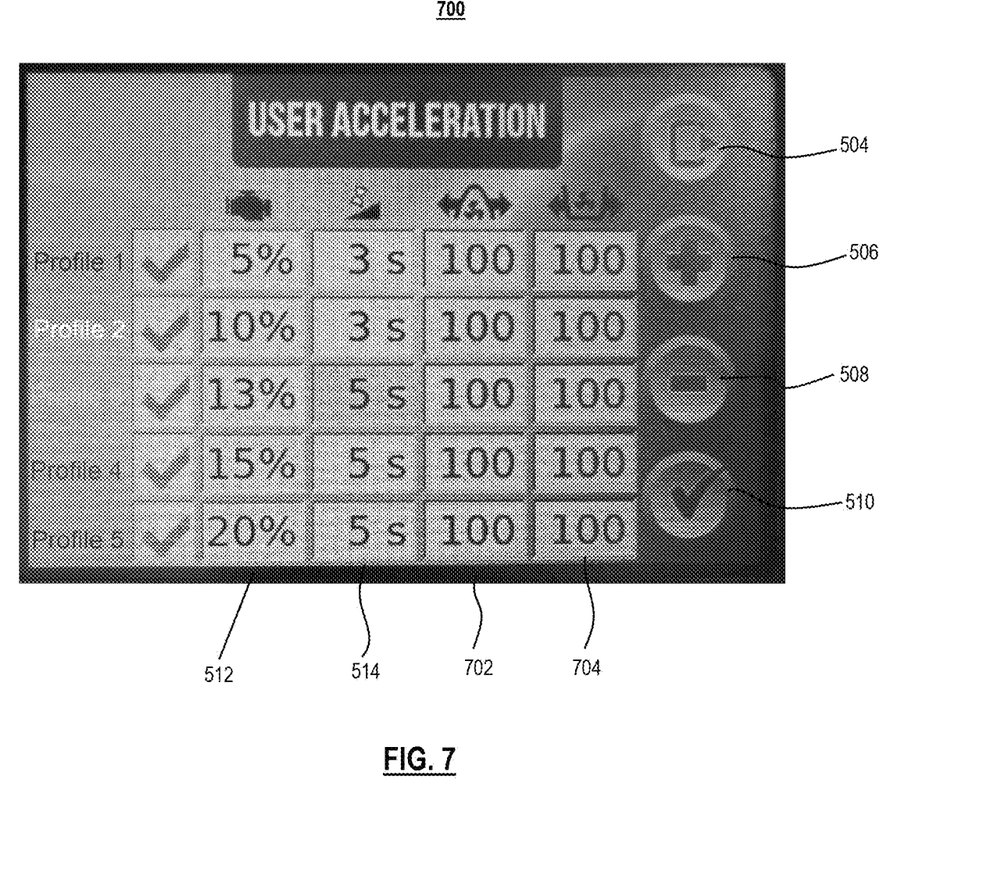
FIG. 7 shows a profile interface diagram for a remote-control unit, as cast to a display device.

FIG. 7 shows a profile interface 700 for a remote-control unit, as cast to a display device, similar to that of FIG. 5. This interface diagram shows several different profiles that can be executed by a remote-control device in accordance with the inventive embodiments. There are several columns that each correspond to the vessel system, such as an engine, a bow thruster, and an aft thruster. Other vessel systems can be included or substituted, as needed. Column 512 shows the maximum engine output field for each profile. Again, the values shown here represent the proportion of the maximum output capability of the engine. Thus, for example, in profile 1 of the top row, the maximum profile setting is 5% of the engine's maximum output capability. If the engine has a maximum engine speed of 5000 RPM, then 5% would be 250 RPM. Thus, using the same example of a maximum output of 5000 RPM, when profile 1 is selected, while the actuator on the remote-control unit is held by the operator, the engine will be controlled to ramp up its output from zero to 250 RPM over a period of three second (column 514) and then it will remain at 250 RPM until the user releases the actuator, whereupon the remote-control unit will send signals that cause the engine output to drop back down to zero (e.g. engine idle, propeller shaft not turning). In addition to engine control in columns 512, 514, there is bow thruster column 702, and an aft thruster column 704. Not all vessels will have such thrusters, and would then be presented with the interface of FIG. 5, but here the vessel includes both bow and aft thrusters. As is well known, thrusters do not generate the same magnitude of output as the engine(s), and are much smaller. Thus, they can typically be run at 100% during docking maneuvers. But the direction of the thrusters, like direction of the engine, and be selected. For example, each field in columns 512, 702, 704 can be highlighted differently to represent forward or reverse for the engine, or port or starboard for each of the thrusters. Thus, a profile can be set up for each of a variety of docking maneuvers.

Figure 8:
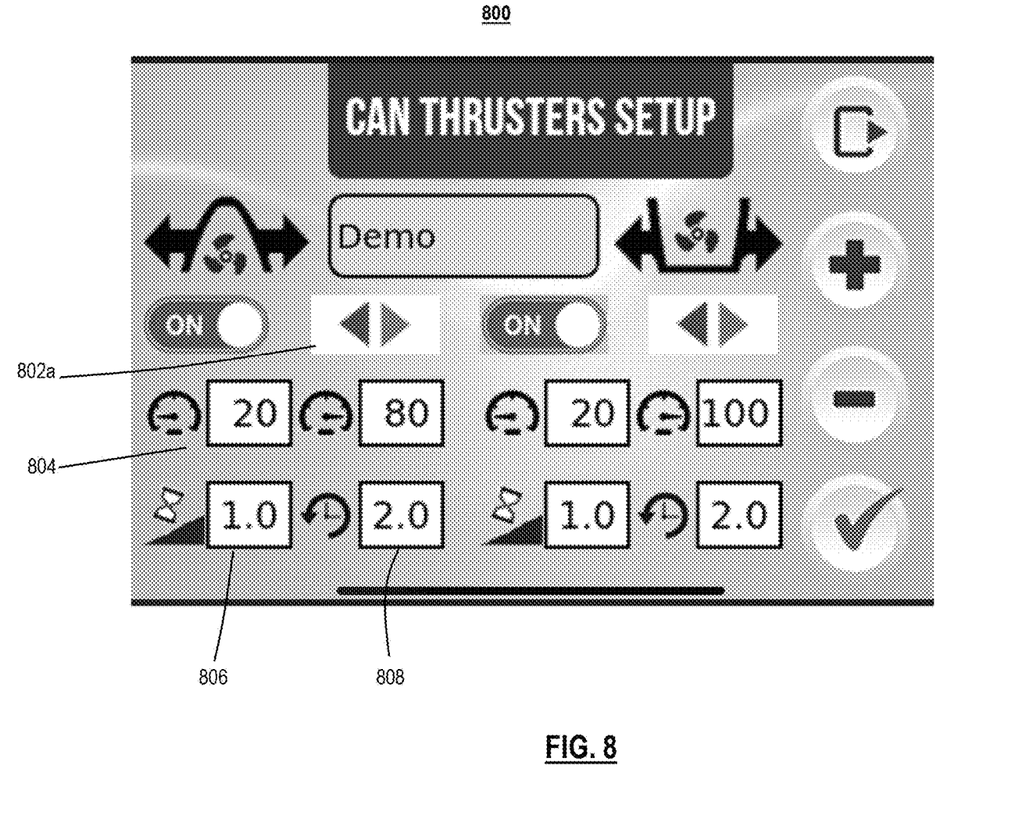
FIG. 8 shows a thruster setup interface as presented to a user for adjusting the thruster operation for a profile.

FIG. 8 shows a thruster setup interface as presented to a user for adjusting the thruster operation for a profile, in accordance with some embodiments. This interface diagram shows an interface for selecting bow thruster direction 802, output range 804, ramp time 806, and total time 808. There are similar fields for the aft thruster. This interface 800 can be a sub-menu to the profile setup interface 700 to specify these parameters for the thrusters. This can be a touch interface that allows the user to touch a given field and then increment or decrement the values. Note that the thrusters can be started at a non-zero output level (e.g. 20%) and then ramp up to the maximum output setting (e.g. 80%) over the duration of the ramp time period 806.

Figure 9:
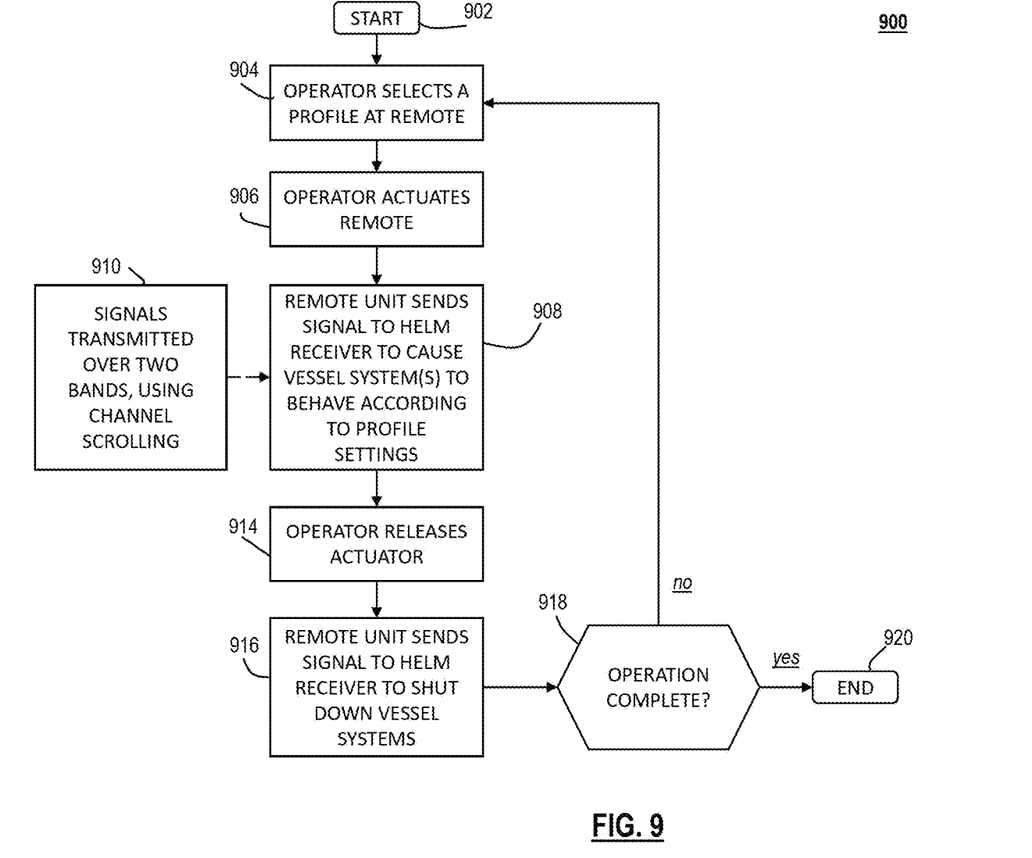
FIG. 9 shows a flowchart diagram of a method of using a remote-control unit for docking a vessel, in accordance with some embodiments.

FIG. 9 shows a flowchart diagram of a method 900 for docking a vessel, in accordance with some embodiments. At the start 902, an operator is prepared to dock a vessel, meaning there is a vessel in proximity of a dock, the vessel includes a helm and a helm receiver that communicates with one or more remote-control units such as remote-control units 202a, 202b. The remote-control units have been provisioned with several profiles to be used in docking maneuvers. In step 904 the operator, using their judgment of the vessel and docking conditions, selects a profile from among several profiles stored in the remote-control unit(s). The operator then actuates the remote-control unit in step 906. Responsive to being actuated, the remote-control unit in step 908 begin transmitting signals to the helm receiver that causes the vessel system(s) to begin increasing their output. This continues so long as the remote-control unit is actuated by the operator. The vessel systems' output is increased over the time specified in the selected profile to the maximum profile setting. As indicated in block 910, the signals can be sent over two different redundant radio frequency bands using channel scrolling in each of the two bands. In step 914 the operator releases actuation of the remote-control unit, and in step 916, response to the actuator being released, the remote-control unit sends signals to the helm receiver to cause the vessel systems' output to shut off. That is, to cease output, even while the vessel system itself may continue running, as in the case of an engine dropping down to zero output even though the engine itself can continue running. In step 918 the operator decides whether further docking maneuvers are needed. If not, then the method ends 920, but if so, then the method returns to step 904. It should be appreciated that step 914 can occur before the vessel system has reached the maximum setting of the profile.

The inventive vessel remote-control system allows authorized personnel, locally or remotely, to view, manage, and diagnose the remote-control units from anywhere in the world using any smart device. The remote-control units can have a 64 bit quad core processor receiver that scrolls more than 100 channels to eliminate interference and provide redundancy and security. The system operates on both 433 MHz and 916 MHz bands for redundancy. Thus, if there is substantial interference in one band, the control signals will still be transmitted on the other band, also using a frequency scrolling algorithm. By being WiFi enabled, authorized personnel can instantly set/modify proportional or incremental control of engines and thrusters, and well as quickly select any of several pre-set profile engine speed settings to suit on-board conditions, and modify them any time via a smart device or remote computer. Another feature of the remote-control units is that they can be remotely accessed to scan for spectrum analyzation trouble shooting or bandwidth antenna tuning. There is two-way communication between the remote unit and receiver at the helm to ensure proper reception of control signals. The remote units can mirror ('cast') an interface on vessel display, such as on a Garmin, Raymarine, or other navigational screens, tablets etc. for easy viewing and editing. Further, the remote units are capable of performing spectral measurements and adjusting their transmission to occur in the least crowded/noisy bands/channels. This feature can be accessed remotely as well so that technicians can perform this operation by remote access, rather than having to be on site with the vessel.

What is claimed is:

1. A remote-control unit for docking a marine vessel, comprising:
　a processor;
　a memory operably coupled to the processor, a plurality of docking maneuver profiles stored in the memory, each of profile of the plurality of docking maneuver profiles indicating a maximum vessel system setting for a respective vessel system, and a ramp up time;
　a radio transceiver operably coupled to the processor that is configured to communicate with a helm receiver;
　a WiFi transceiver operably coupled to the processor;
　at least one actuator operably coupled to the processor; and
　wherein when the at least one actuator is actuated the radio transceiver transmits control signals to the helm receiver in accordance with a selected one of the plurality of docking maneuver profiles to cause the respective vessel system to increase output over a duration equal to the ramp up time period to the maximum vessel system setting.

2. The remote-control unit of claim 1, wherein the radio transceiver transmits control signals on two different radio frequency bands.

3. The remote-control unit of claim 2, wherein the radio transceiver transmits the control signals over a series of channels in each of the two radio frequency bands by continuously scrolling through the channels.

4. The remote-control unit of claim 1, wherein the at least one actuator is at least one incremental actuator.

5. The remote-control unit of claim 1, wherein the at least one actuator is a joystick that provides proportional actuation.

6. The remote-control unit of claim 1, wherein the memory further contains security parameters, and wherein the remote-control unit can be accessed remotely via the WiFi transceiver by providing credentials that satisfy the security parameters.

7. The remote-control unit of claim 1, wherein the processor is configured to cast an interface to a helm display via the WiFi transceiver.

8. The remote-control unit of claim 1, wherein the respective vessel system is an engine of the marine vessel.

9. The remote-control unit of claim 1, further comprising a selector button that is operably coupled to the processor and which is operable to select one of the plurality of docking maneuver profiles.

10. A docking system for a marine vessel, the marine vessel having an engine, comprising:
　a helm control that is operably coupled to the engine;
　a helm receiver that is operably coupled to the helm control;
　a remote-control unit comprising:
　　a processor;
　　a memory operably coupled to the processor, a plurality of docking maneuver profiles stored in the memory, each of profile of the plurality of docking maneuver profiles indicating a maximum vessel system setting for the engine, and a ramp up time;
a radio transceiver operably coupled to the processor that is configured to communicate with the helm receiver;
a WiFi transceiver operably coupled to the processor;
at least one actuator operably coupled to the processor; and
wherein when the at least one actuator is actuated the radio transceiver transmits control signals to the helm receiver in accordance with a selected one of the plurality of docking maneuver profiles to cause the engine to increase output over a duration equal to the ramp up time period to the maximum vessel system setting.

11. The remote-control unit of claim 10, wherein the radio transceiver transmits control signals on two different radio frequency bands.

12. The remote-control unit of claim 11, wherein the radio transceiver transmits the control signals over a series of channels in each of the two radio frequency bands by continuously scrolling through the channels.

13. The remote-control unit of claim 10, wherein the at least one actuator is at least one incremental actuator.

14. The remote-control unit of claim 10, wherein the at least one actuator is a joystick that provides proportional actuation.

15. The remote-control unit of claim 10, wherein the memory further contains security parameters, and wherein the remote-control unit can be accessed remotely via the WiFi transceiver by providing credentials that satisfy the security parameters.

16. The remote-control unit of claim 10, wherein the processor is configured to cast an interface to a helm display via the WiFi transceiver.

17. The remote-control unit of claim 10, wherein the respective vessel system is an engine of the marine vessel.

18. The remote-control unit of claim 10, further comprising a selector button that is operably coupled to the processor and which is operable to select one of the plurality of docking maneuver profiles.

* * * * *